United States Patent [19]
Tsai et al.

[11] Patent Number: 5,351,179
[45] Date of Patent: Sep. 27, 1994

[54] LOSSLESS ACTIVE SNUBBER FOR HALF-BRIDGE OUTPUT RECTIFIERS

[75] Inventors: Fu Sheng Tsai, Northboro; Dhaval B. Dalal, Shrewsbury, both of Mass.

[73] Assignee: Digital Equipment Corporation, Maynard, Mass.

[21] Appl. No.: 27,031

[22] Filed: Mar. 5, 1993

[51] Int. Cl.$^5$ .............................................. H02M 7/06
[52] U.S. Cl. ...................................... 363/53; 363/17; 363/126
[58] Field of Search ....................... 363/17, 44, 45, 46, 363/530, 84, 89, 126, 52, 127

[56] References Cited

U.S. PATENT DOCUMENTS

| | | | |
|---|---|---|---|
| 4,441,146 | 4/1984 | Vinciarelli | 363/20 |
| 5,140,509 | 8/1992 | Murugan | 363/17 |
| 5,255,174 | 10/1993 | Murugan | 363/17 |

FOREIGN PATENT DOCUMENTS

| | | | |
|---|---|---|---|
| 0443342 | 8/1991 | European Pat. Off. | G05F 1/38 |
| 8302370 | 7/1983 | PCT Int'l Appl. | H02M 1/12 |

OTHER PUBLICATIONS

Loweday H. Mweene et al., "A 1 kW, 500 kHz Front-End Converter for a Distributed Power Supply System," *IEEE*, Mass. Institute of Tech., CH2719, pp. 423–432, Mar. 1989.

J. A. Sabaté et al., "High-Voltage, High-Power, ZVS, Full-Bridge PWM Converter Employing an Active Snubber," *IEEE*, VA Polyt. Inst., CH2992, pp. 158–163, Jun. 1991.

Koosuke Harada et al., "Switched Snubber for High Frequency Switching," *IEEE*, Kyushu University, CH2873, pp. 181–188, Aug. 1990.

Bruce Carsten, "Design Techniques for Transformer Active Reset Circuits at High Frequencies and Power Levels," *Proceedings*, HFPC, pp. 235–246, May 1990.

*Primary Examiner*—Jeffrey L. Sterrett
*Attorney, Agent, or Firm*—Richard J. Paciulan; Denis G. Maloney

[57] ABSTRACT

A bridge-type primary switching circuit (12) is represented by a pulsed voltage source (VSW). The primary switched waveform is transformed to secondary circuit (14) using a transformer (T1) with the required turns ratio N and a center-tapped secondary winding (16). Half-bridge rectifier (18) formed by diodes (DR1) and (DR2) rectifies the secondary waveform and feeds the waveform through a low-pass filter (LF) and (CF) to obtain the desired DC output voltage. The snubber circuit (20) is represented by switch-diode-capacitor combinations (SA-DS1-CS1) and (SB-DS2-CS2) across each rectifier (DR1) and (DR2). Capacitances (CS1) and (CS2) are selected large enough such that their voltages remain essentially constant during a switching cycle. The controlled switches (SA) and (SB) are turned ON with a specific delay after the primary voltage reaches a magnitude close to the input voltage in order to allow the rectifier diodes (DR1) and (DR2) to be commutated. It is crucial that the switches (SA) and (SB) be turned OFF before the primary voltage collapses to zero to avoid current spikes through the switches.

18 Claims, 11 Drawing Sheets

LOSSLESS ACTIVE SNUBBER FOR HALF-BRIDGE OUTPUT RECTIFIERS

BACKGROUND OF THE INVENTION

1. Field of the Invention

The present invention relates generally to a circuit for controlling voltage spikes and ringing during turn-off of half-bridge rectifiers in bridge-type pulse width modulated direct current - direct current (PWM DC-DC) converters. More particularly, it relates to such a circuit for controlling voltage spikes and ringing which redirects energy in a leakage inductance of a transformer to a load in a lossless manner using active switches. Most especially, it relates to such a circuit for controlling voltage spikes and ringing which permits use of lower voltage rectifiers and significantly reduces conduction losses.

2. Description of the Prior Art

When output rectifiers of a PWM DC-DC converter with transformer isolation turn off, voltage spikes and high-frequency ringing are induced across the rectifier terminals due to the presence of leakage inductances in the transformer. The voltage spikes impose severe stresses on the rectifiers and force one to use higher voltage rectifiers, resulting in higher conduction losses. Traditionally, resistance—capacitance (R-C) or resistance—diode—capacitance (R-D-C) snubber circuits are used across the rectifiers to limit the voltage spikes. The capacitance chosen in an R-C or R-D-C snubber is usually much larger than the junction capacitance of the rectifier, so that the majority of the leakage inductor current is diverted through the snubber, resulting in a smaller voltage overshoot. The resistor provides necessary damping to reduce ringing, but it dissipates energy. The energy stored in the capacitors has to be redirected to the load each cycle when the rectifier turns on. This introduces additional losses in the resistor unless a diode is used across it (R-D--C). Tradeoffs are usually necessary in the choice of R and C values, since a large capacitance reduces voltage spikes while increasing the power dissipation, and a smaller resistance reduces losses while decreasing the damping effects. An optimum design is hard to achieve.

Various clamping and snubbing circuits have been proposed to limit or eliminate voltage spikes across rectifiers. It is known to provide a R-D-C clamp circuit for a full-bridge rectifier as shown in FIGS. 1 and 1A in the present application. Although such a circuit can effectively limit the voltage across the rectifier, significant energies are lost in the discharging resistance. A known lossless active snubber circuit totally eliminates voltage overshoot and ringing across a full-bridge rectifier. While this circuit has many virtues and requires a few extra components, it is not clear whether and how it can be implemented in a half-bridge rectifier, which most low to medium voltage power converters have adopted.

SUMMARY OF THE INVENTION

These and related problems may be solved and features may be obtained through use of the novel lossless active snubber for half-bridge output rectifiers herein disclosed. A lossless active snubber for a half bridge output rectifier in accordance with the invention includes a bridge-type primary switching circuit having an input for a direct current at a first voltage and having an output supplying a chopped alternating current signal derived from the direct current. A transformer includes a primary winding connected to the output and a center-tapped secondary winding. A half-bridge rectifier includes first and second rectifier diodes connected to the two end terminals of the center-tapped secondary winding. A snubber circuit is connected across the first and second rectifier diodes. The snubber circuit includes a first snubber diode connected in a reverse direction to the first rectifier diode. A first snubber capacitor is serially connected to the first snubber diode. The first snubber diode and first snubber capacitor are connected across the first rectifier diode. A first controllable switch is connected across the first snubber diode. A second snubber diode is connected in a reverse direction to the second rectifier diode. A first control signal input is connected to the first controllable switch to turn the first controllable switch ON during a maximum magnitude of a first sign in a pulse of the chopped alternating current signal.

The attainment of the foregoing and related advantages and features of the invention should be more readily apparent to those skilled in the art, after review of the following more detailed description of the invention, taken together with the drawings, in which:

DETAILED DESCRIPTION OF THE INVENTION

Figure 1:
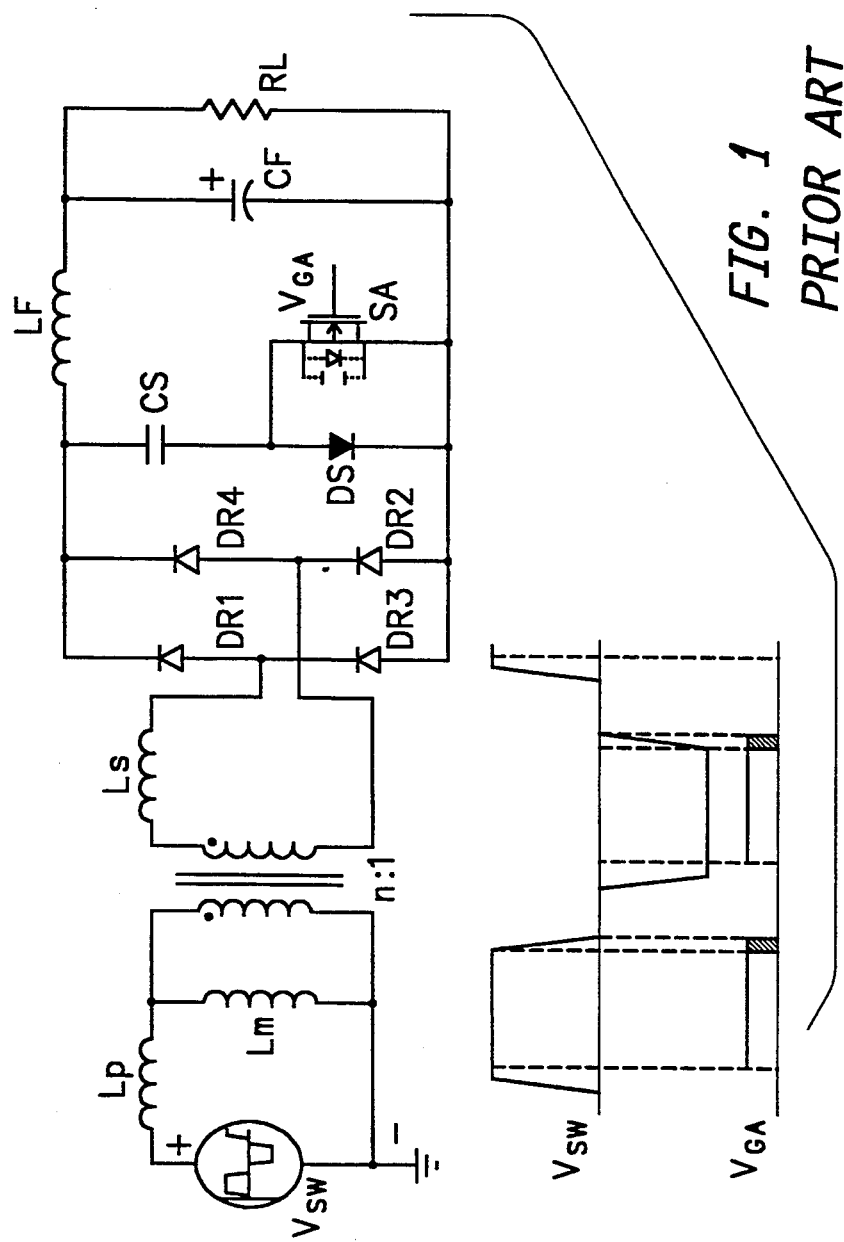
FIG. 1 is a previously proposed active snubber for a full-bridge rectifier.
Figure 2:
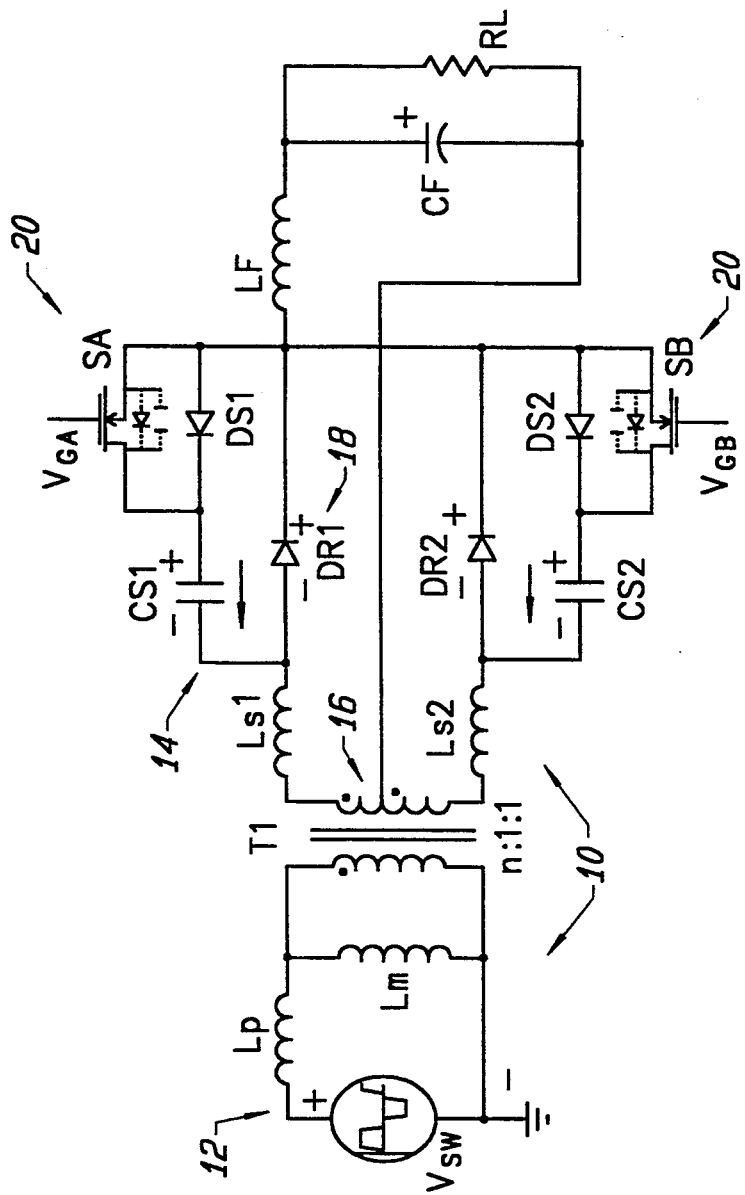
FIG. 2 is a generalized circuit schematic of a lossless active snubber for half-bridge output rectifiers in accordance with the invention.
Figure 2A:
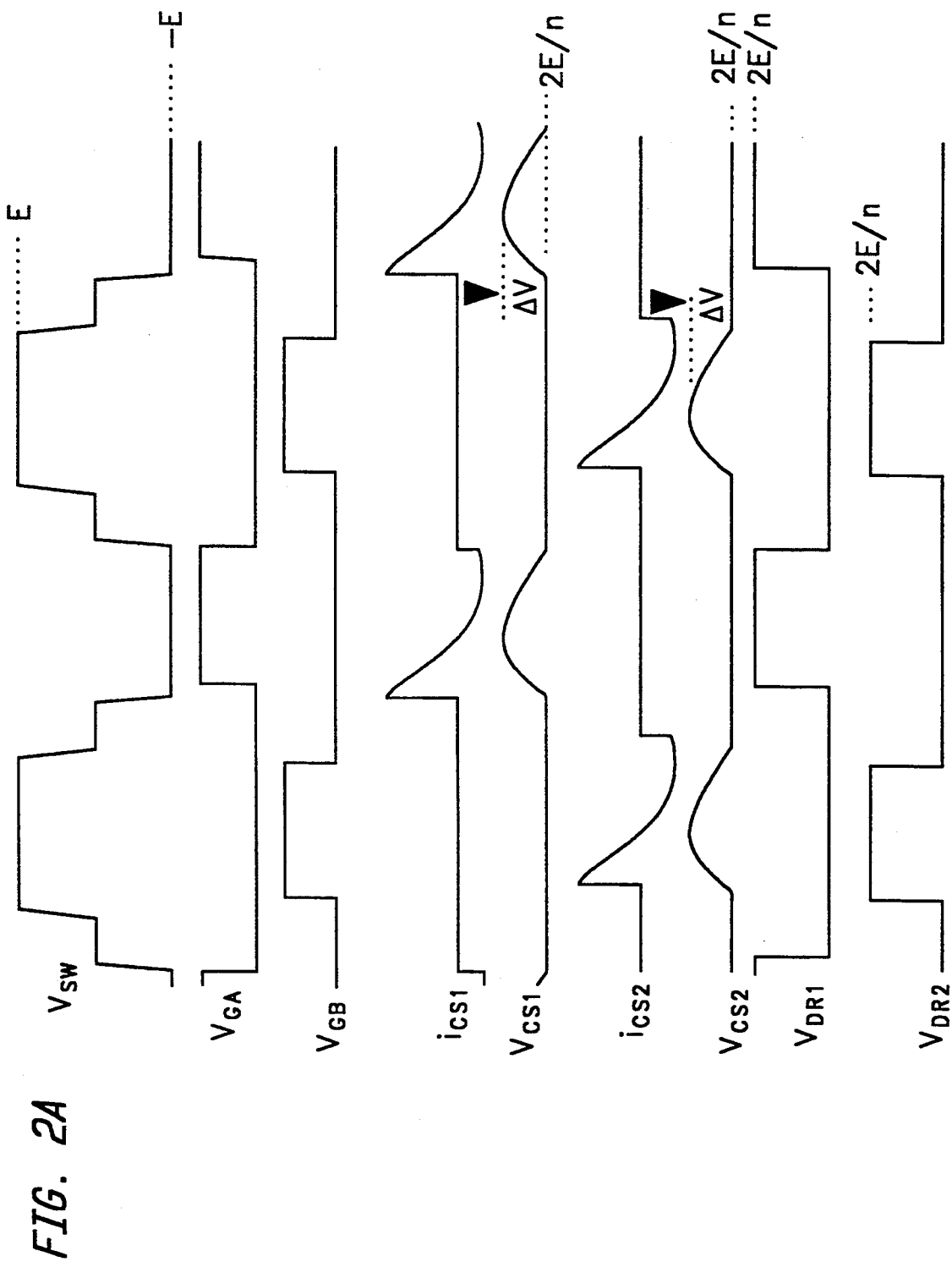
FIG. 2A is a set of waveform diagrams for the circuit of FIG. 2.

Turning now to the drawings, more particularly to FIGS. 2 and 2A, there is shown a simplified schematic of the proposed circuit 10 and several waveforms related thereto. A bridge-type primary switching circuit 12 is represented by a pulsed voltage source VSW. The primary topology can be a half-bridge, a full bridge or any other configuration of switches which chops the DC input voltage into an AC form at a given switching frequency. The primary switched waveform VSW (FIG. 2A) is transformed to secondary circuit 14 using a transformer T1 with the required turns ratio N and a center-tapped secondary winding 16. Transformer T1 primary leakage inductance and magnetizing inductance are represented by LP and LM, respectively, and its secondary leakage inductances are represented by LS1 and LS2. Half-bridge rectifier 18 formed by diodes DR1 and DR2 rectifies the secondary waveform and feeds the waveform through a low-pass filter LF and CF to obtain the desired DC output voltage.

Figure 5:
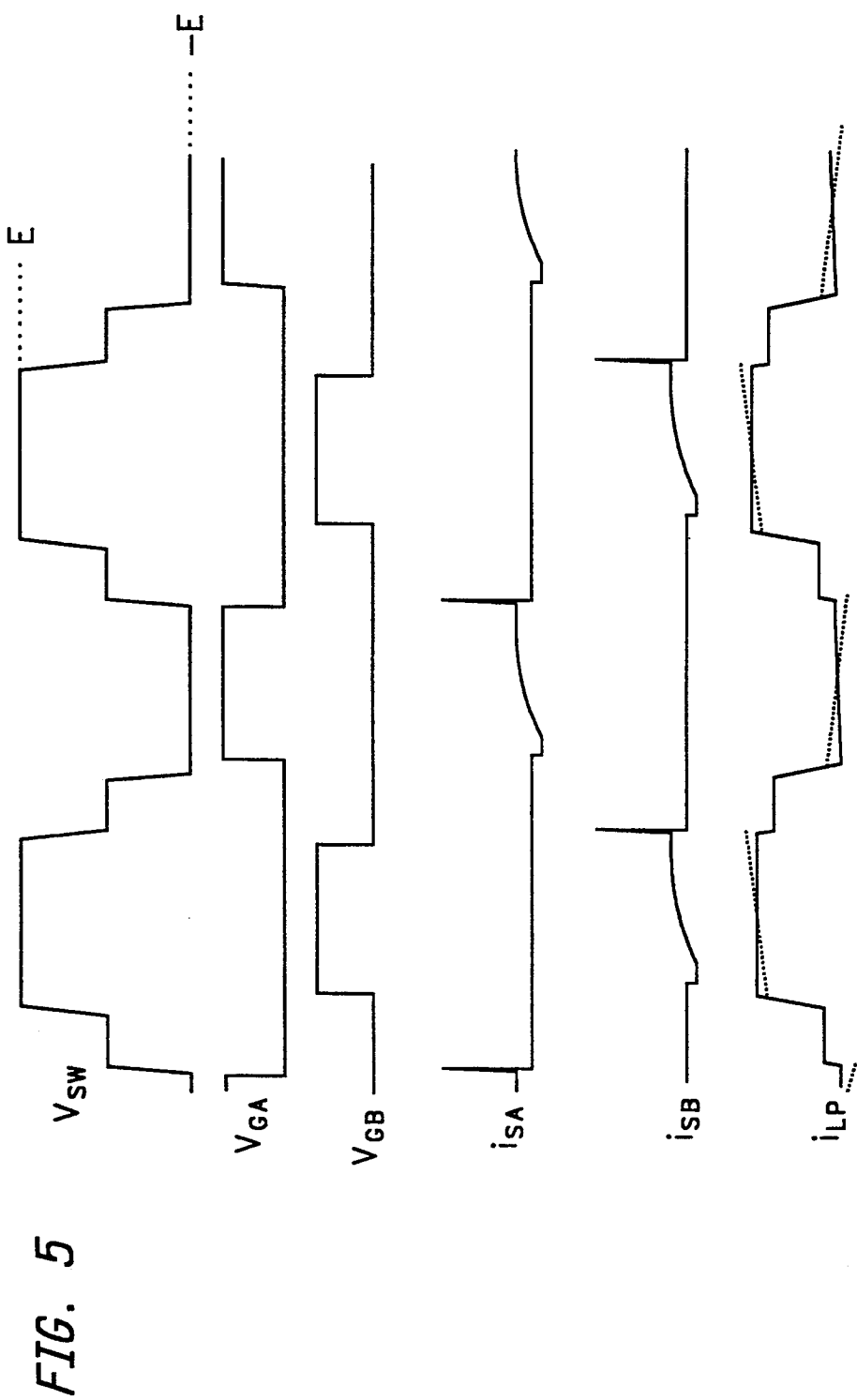
FIG. 5 is a set of waveforms for a condition when SA and SB are not turned off before $V_{sw}$ changes magnitude significantly.

The snubber circuit 20 is represented by switch-diode-capacitor combinations SA-DS1-CS1 and SB-DS2-CS2 across each rectifier DR1 and DR2. Capacitances CS1 and CS2 are selected large enough such that their voltages remain essentially constant during a switching cycle. VCTA and VCTB are the control voltages for switches SA and SB, respectively. The controlled switches SA and SB are turned ON with a specific delay after the primary voltage VSW reaches a magnitude close to the input voltage in order to allow the rectifier diodes DR1 and DR2 to be commutated. It is crucial that the switches SA and SB be turned OFF before the voltage VSW collapses to zero to avoid current spikes through the switches (FIG. 5). MOSFETS are used to represent the controlled switches (SA and SB) in the active snubbers; however, any controlled switches, such as BJT, IGBT, and so forth may be used for this purpose. The MOSFET switches in the Figures are drawnm with a phantom or dashed capacitor and diode in parallel between the source and the drain to represent these MOSFET characteristics. Separate capacitors and diode elements are not actually present in the circuit.

The detailed circuit operation is as follows. As the voltage pulse in the primary of the transformer T1 goes positive, the dotted terminals in the secondary go positive. Rectifier diode DR1 turns ON and commutation of DR2 starts. The current through DR2 is decreased to zero and begins to flow in the reverse direction (reverse recovery). After the reverse recovery is completed, DR2 turns OFF and the current, which can not instantaneously go to zero due to the presence of LS2, flows through CS2 and DS2, as this is the lowest impedance path. The voltage across DR2 is clamped to the voltage of CS2. If CS2 is chosen sufficiently high, its voltage will be held at a constant value, preventing any ringing or overshoot. The recovery current charges CS2 up, whose energy is then discharged to the load when SB is turned ON. As a result, a majority of the leakage energies are recovered and delivered to the load instead of being dissipated in the external resistances. Before the voltage in the primary starts decreasing, SB is turned OFF to disengage CS2 from the rest of the circuit. This prevents large current spikes from being generated through SB when the primary voltage decreases. The circuit is then returned to conventional operation. As the primary voltage reaches zero, DR2 is turned ON and the filter inductor current free-wheels through both DR1 and DR2 until the primary voltage goes negative. At that instant, a similar process occurs with the roles of DR1, CS1, SA, DS1 and DR2, CS2, SB, DS2 interchanged, respectively.

The gate-drive signals for auxiliary switches SA and SB are derived from the primary gate-drive signals as illustrated in FIGS. 3-3B and FIGS. 4-4B. Certain conditions have to be met for this snubber circuit to function properly. First, it is required that SA or SB not be turned ON while DR1 or DR2 are conducting, including the reverse recovery period. Hence, the turn ON of SA or SB must be delayed by a fixed amount of time with respect to the turn ON of Q3 and Q4 or Q1 and Q2 to allow proper commutation of DR1 or DR2. Also, it is essential that SA or SB be turned OFF prior to the magnitude of the primary voltage decreasing significantly. Otherwise, high current spikes will be generated through the leakage inductances, as shown in FIG. 5, and significant losses introduced in the auxiliary switches.

Figure 3:
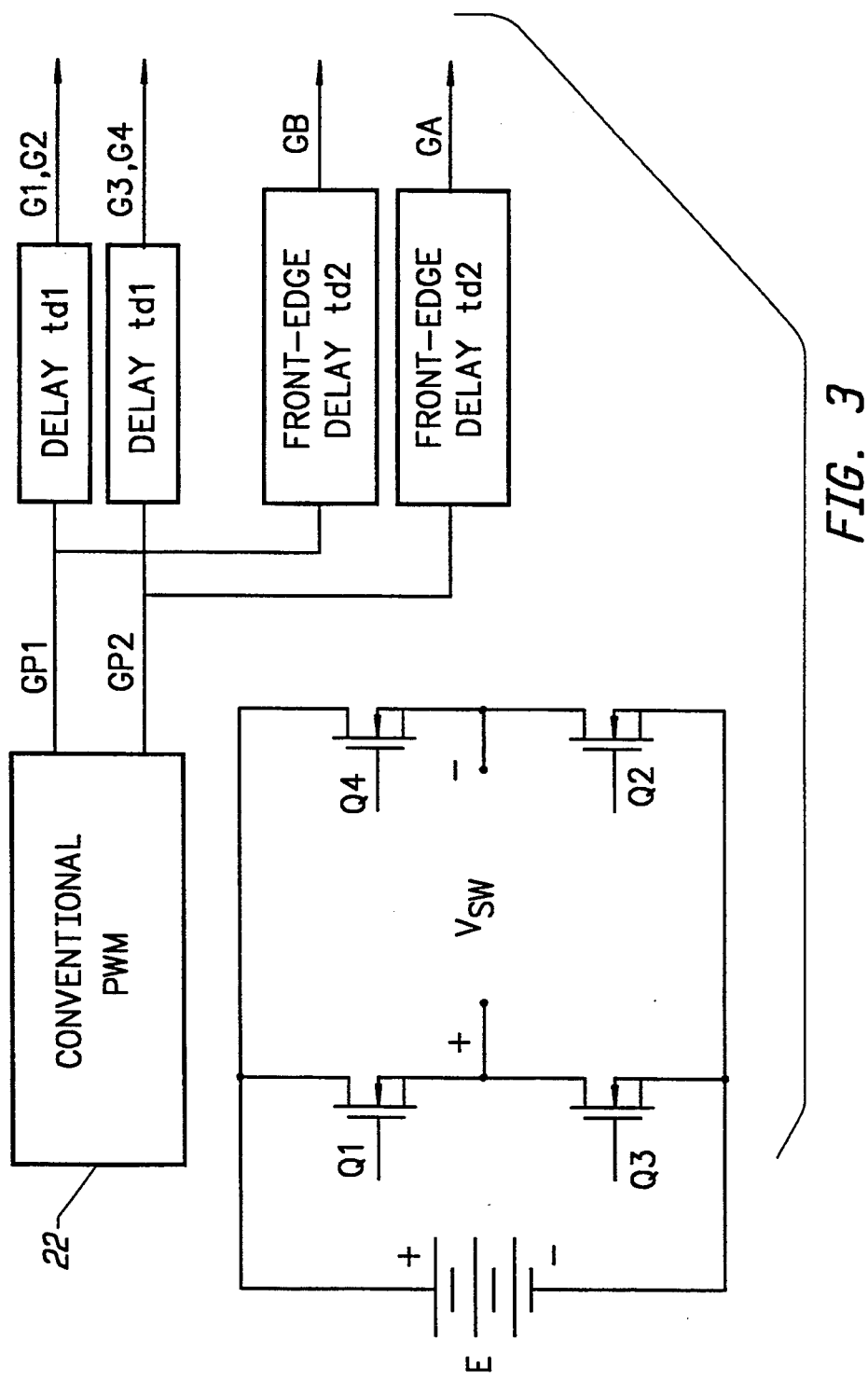
FIG. 3 is a block diagram of one form of a control signal generator for the circuit of FIG. 2.
Figure 3A:
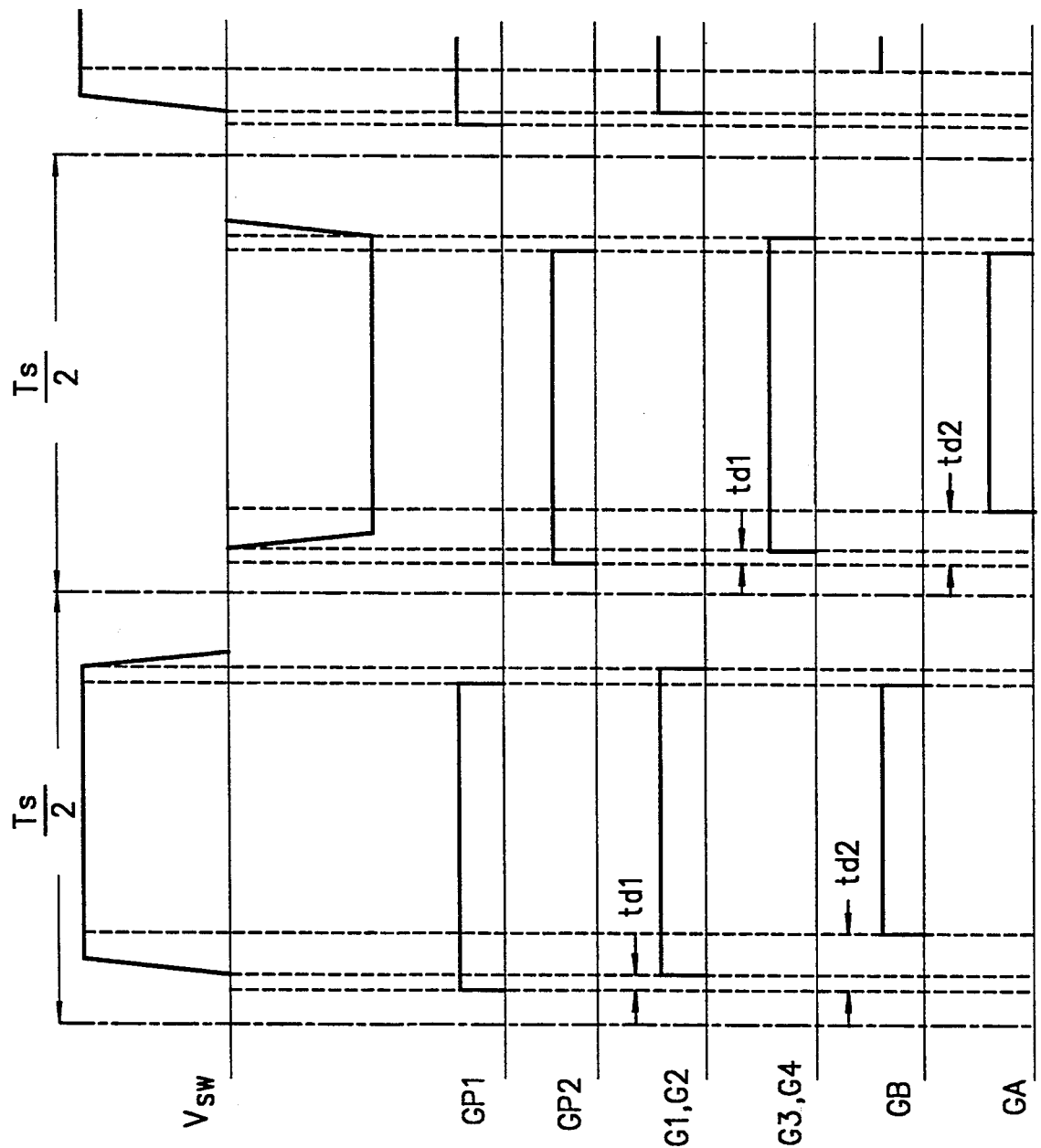
FIG. 3A is a set of waveform diagrams for the control signal generator of FIG. 3.

FIGS. 3 and 3A illustrate the implementation of gate-drive signals for the active snubber in a conventional full-bridge PWM converter 22, where switches Q1, Q2 or Q3,Q4 are turned ON/OFF simultaneously. A similar circuit applies for a half-bridge PWM converter. The logic signals GP1 and GP2 are generated by certain PWM control. A time delay td1 is introduced in GP1 or GP2 to generate the gating signals G1, G2 or G3, G4 for the primary switches Q1, Q2 or Q3, Q4. Another front edge time delay td2 is introduced in GP1 or GP2 to generate gating signals GB or GA for the auxiliary switch SB or SA. Both delays can be accounted for by the propagation delays in the logic gates, the driver chips or the gate-drive circuits including the gate-drive transformers. The delay td1 should allow SB or SA to turn OFF before Q1, Q2 or Q3, Q4, while the delay td2 should provide enough time for DR1 or DR2 to complete commutation before SA or SB is turned ON. In general, td2 need not be tightly controlled.

Figure 4:
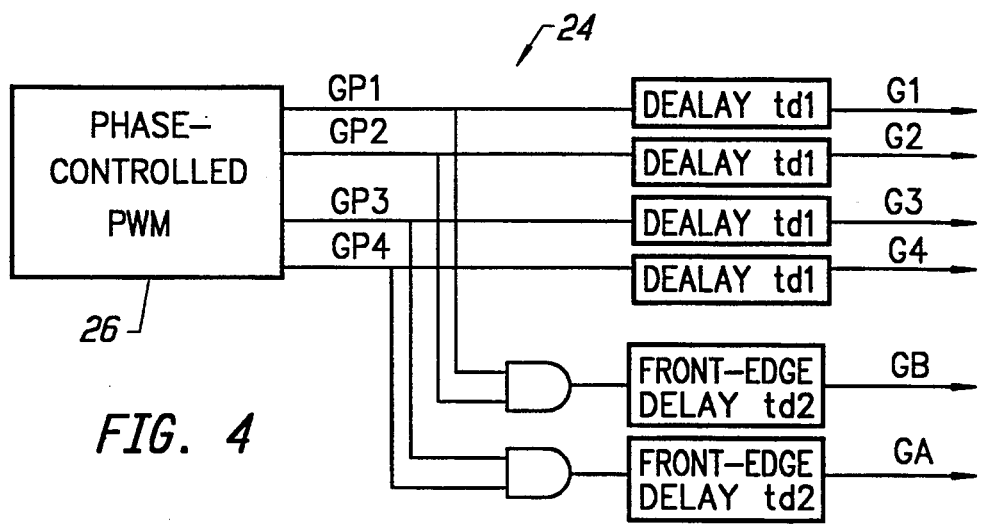
FIG. 4 is a block diagram of another form of a control signal generator for the circuit of FIG. 2.
Figure 4A:
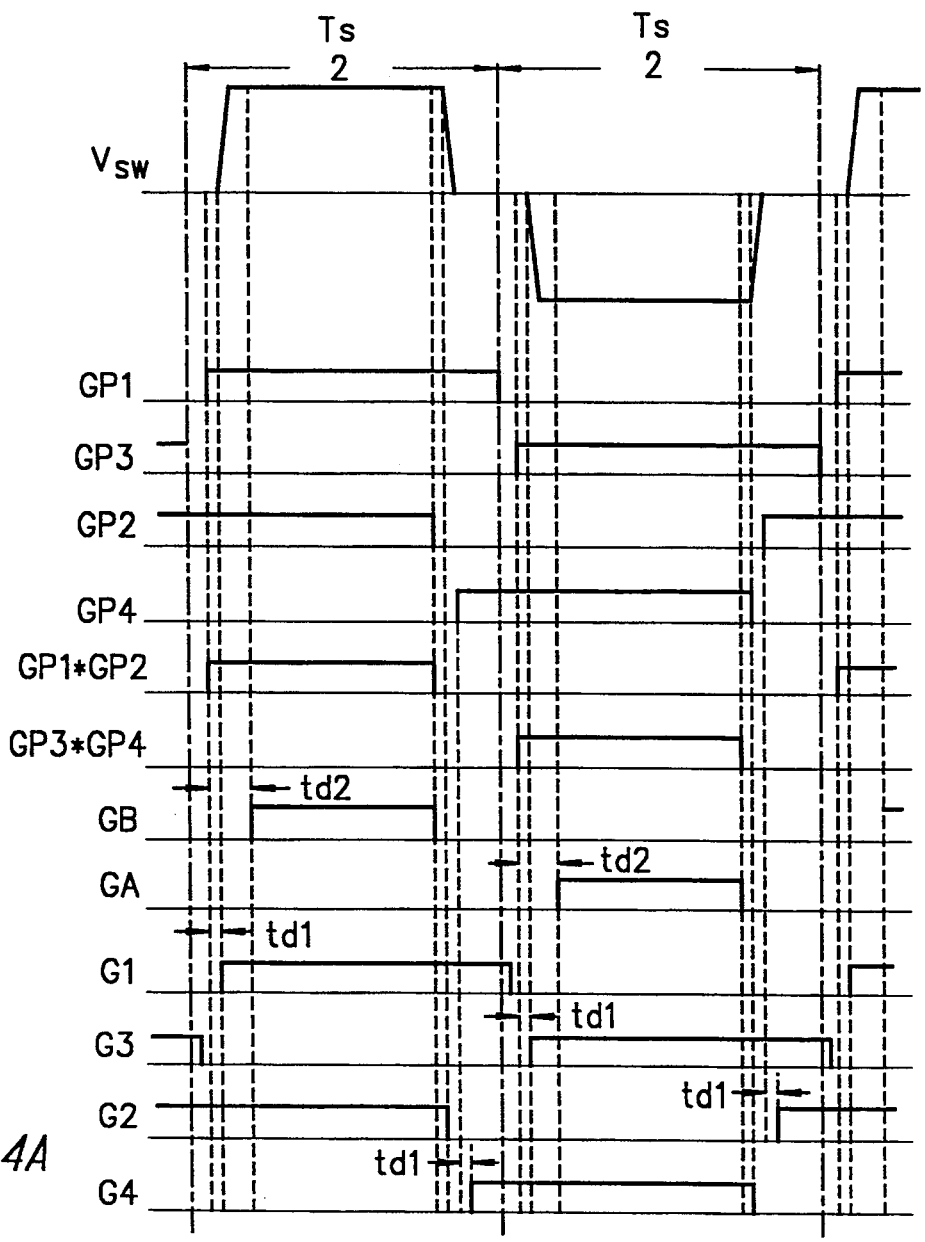
FIG. 4A is a set of waveform diagrams for the control signal generator of FIG. 4.

FIGS. 4-4A illustrate the gating arrangement for implementing the lossless active snubbing in a phase-controlled PWM converter 24. In this circuit, all the primary switches are operated with 50% duty cycle, and the output is controlled by changing the phase delay between gating signals for Q1 and Q2 or Q3 and Q4. In FIGS. 4-4A, four logic signals GP1-GP4 are generated from a phase controlled PWM circuit 26 with GP1 and GP3 or GP2 and GP4 being complementary pulses. Each pulse is almost at 50% duty-cycle. As explained earlier, SB or SA should be triggered only when DR2 or DR1 is OFF. This occurs when VSW is positive or negative, respectively. Thus, GB or GA is generated by ANDing GP1 and GP2 or GP3 and GP4 with proper front-edge delay introduced as shown. The selection of the delays is similar to the case of the conventional full-bridge PWM converter.

The snubbing circuit as described above is operational from no load to full load. In other words, it is operational in both continuous and discontinuous modes of operation.

Figure 6:
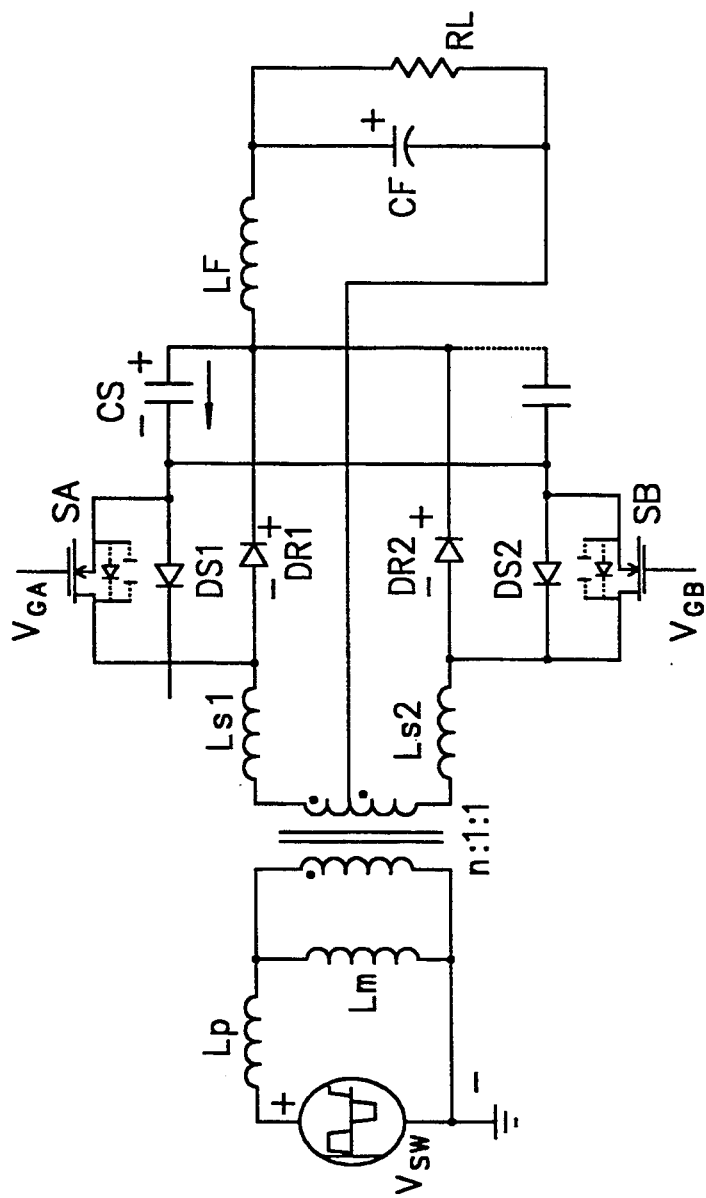
FIG. 6 is a circuit schematic of a second embodiment of a lossless active snubber for half-bridge output rectifiers in accordance with the invention.
Figure 6A:
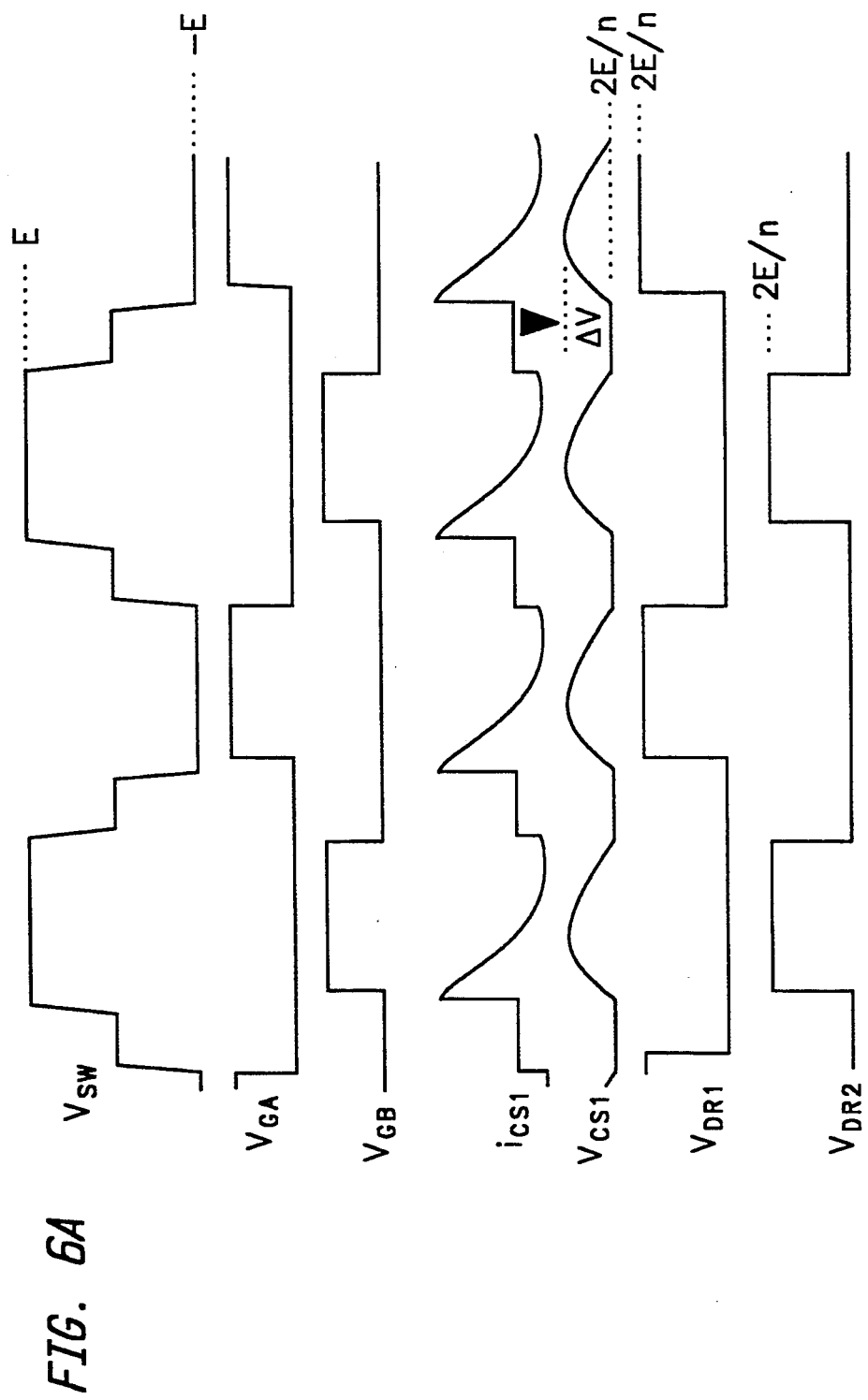
FIG. 6A is a set of waveform diagrams for the circuit of FIG. 6.
Figure 7:
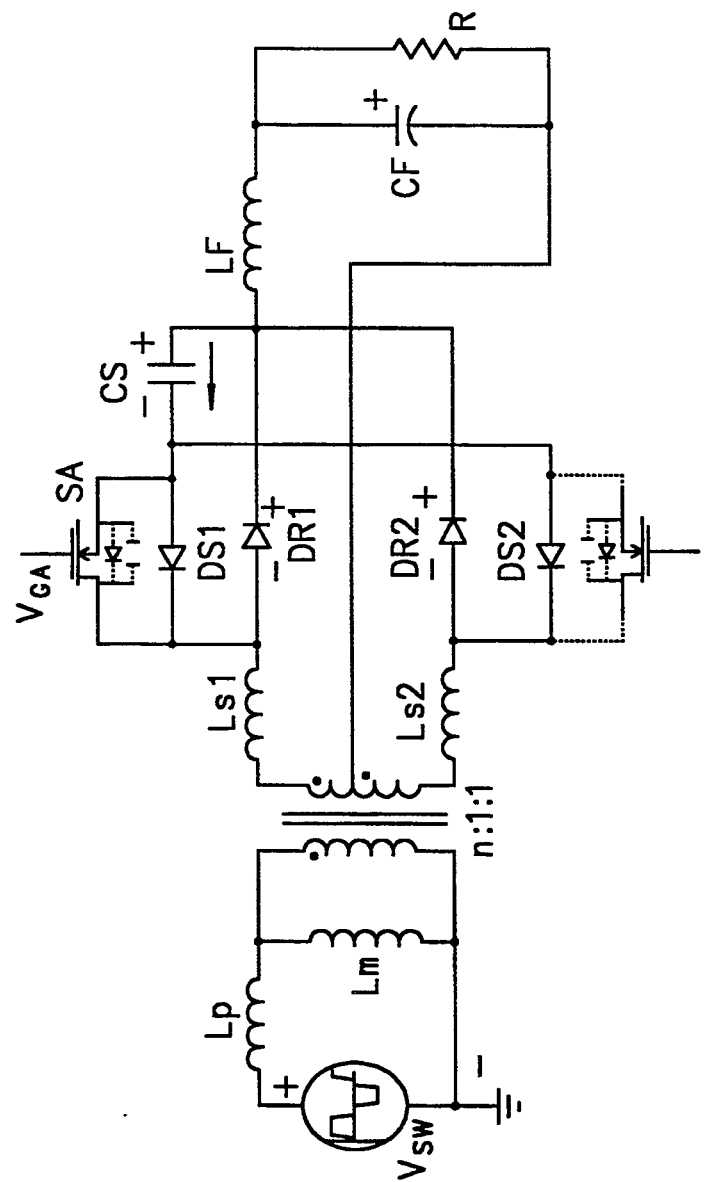
FIG. 7 is a circuit schematic of a third embodiment of a lossless active snubber for half-bridge output rectifiers in accordance with the invention.
Figure 7A:
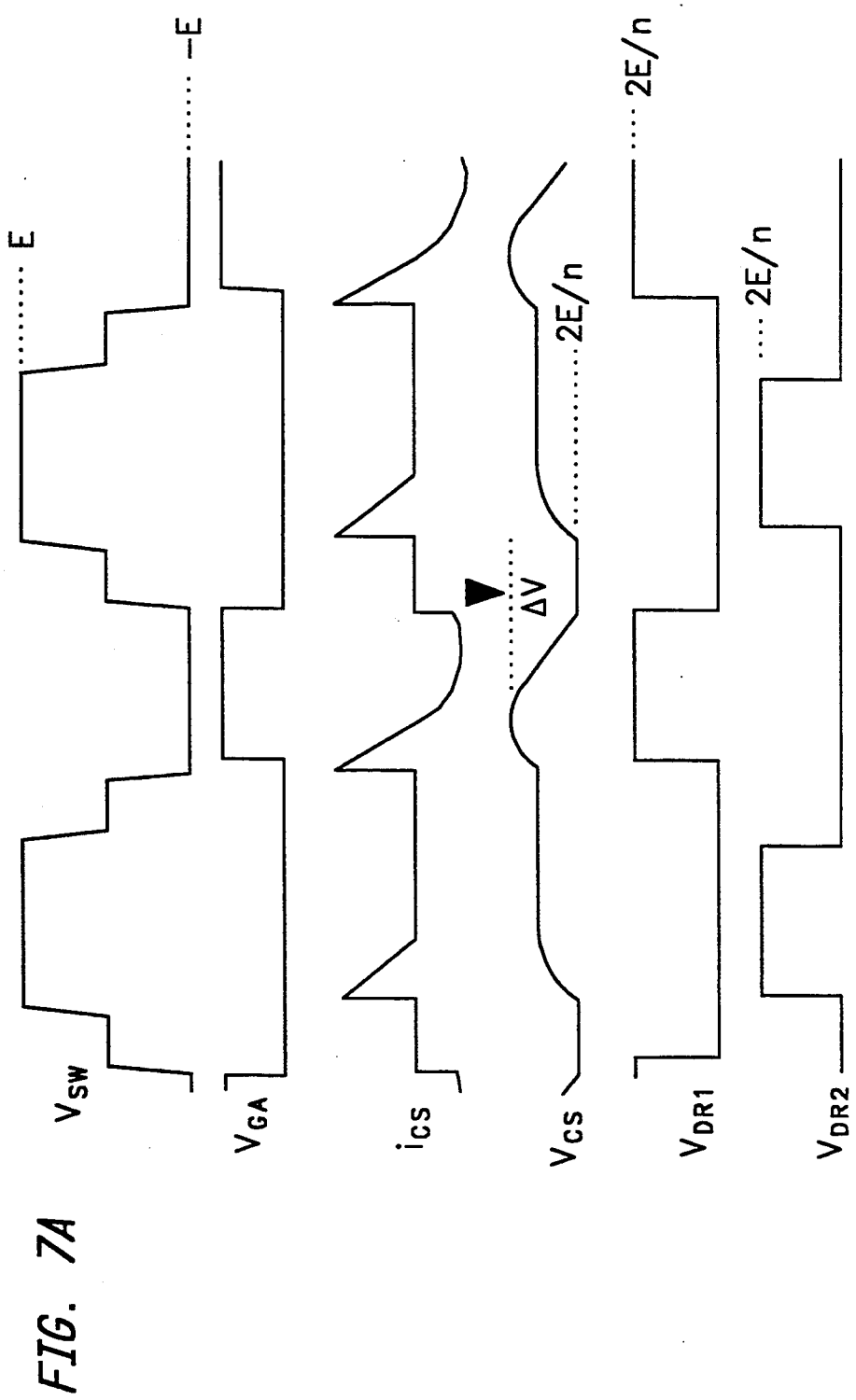
FIG. 7A is a set of waveform diagrams for the circuit of FIG. 7.

The snubber circuit can be simplified to reduce the number of components. By tying the sources of MOSFETs SA and SB together as shown in FIGS. 6 and 6A, the capacitor CS2 (FIG. 2) can be eliminated. There is no detrimental effect when only one capacitor is used. Furthermore, one of the auxiliary switches can also be eliminated, as shown in FIGS. 7 and 7A. In so doing, capacitor CSA is charged every half-cycle, but discharged every other half-cycle, which results in slightly higher voltage fluctuation across the capacitor and slight imbalance in circuit operation. The impact, however, is minimal. It should be noted that the anti-parallel diodes DS1, DS2 have to be present across each of the rectifier diodes DR1, DR2 under all circumstances.

A primary advantage of the active snubber circuit of this invention is that it totally eliminates snubbing losses and high-frequency ringing, which results in higher efficiency, smaller size, reduced cost, improved reliability and reduced electromagnetic interference (EMI). Power losses are reduced for two reasons:

(a) The circuit enables the use of lower voltage rectifiers because it eliminates voltage spikes and ringing across the rectifiers. Lower voltage rectifiers have lower forward drop leading to lower conduction losses. In a specific implementation providing a 48 volt output at 1500 watts, voltage requirements for the rectifiers would have been between 400 and 600 volts without the use of the active snubber circuit. With the snubber circuit, it is possible to use 200 volt rectifiers and still maintain sufficient margin. The forward drops are approximately 0.95, 1.3 and 1.5 volts for the 200, 400 and 600 volt rectifiers, respectively. This means savings of 10-15 watts in conduction losses alone. Another significant advantage of using lower voltage rectifiers lies in the reverse recovery characteristics of the rectifiers. Due to the limitations in current device technology, the reverse recovery current in rectifier diodes become much higher when the devices are rated above 200 volts. Also, at higher di/dt conditions, the recovery behavior of the rectifiers cannot be well-controlled. On certain occasions, thermal runaway is observed when higher voltage devices are used to sustain voltage spikes. Higher recovery current also makes the snubber design more difficult.

(b) Due to the lossless nature of this circuit, the energies in the leakage inductances of the transformer are redirected to the load without going through dissipative resistors, as in the conventional R-C or R-D-C snubbers. The measured improvement in efficiency is about 2.5 to 3 percent (35-40 watts) over a circuit using conventional RC snubbers. Reduced losses also lead to smaller heat sinks and thus, reduced cost. Lower thermal stresses improve the reliability of the rectifier. Elimination of high-frequency ringing reduces radiated and conducted EMIs. The cost and complexity of additional components (1 less capacitor, 2 more diodes, 2 less resistors, 1 or 2 more controlled switches and additional related drive circuitry as compared to a conventional R-C snubber) are easily offset by the gains outlined above.

It should be apparent to those skilled in the art that various changes in form and details of the invention as shown and described may be made. It is intended that such changes be included within the spirit and scope of the claims appended hereto.

Copending U.S. patent application Ser. No. 08/027,217 filed Mar. 5, 1993 is hereby incorporated by reference in its entirety.

What is claimed is:

1. A pulse width modulated direct current—direct current converter circuit, which comprises a bridge-type primary switching circuit having an input for a direct current at a first voltage and having an output supplying a chopped alternating current signal derived from the direct current, a transformer including a primary winding connected to the output of the primary circuit and a center-tapped secondary winding, a half-bridge rectifier including first and second rectifier diodes connected to each of two end terminals of said center-tapped secondary winding, and a snubber circuit connected across said first and second rectifier diodes, said snubber circuit including a first snubber diode connected in a reverse direction to said first rectifier diode, a first snubber capacitor serially connected to said first snubber diode, said first snubber diode and first snubber capacitor being connected across said first rectifier diode, a first controllable switch connected across said first snubber diode, a second snubber diode connected in a reverse direction to said second rectifier diode and a first control signal input connected to said first controllable switch to turn said first controllable switch ON during a maximum magnitude of a first polarity in a pulse of the chopped alternating current signal.

2. The pulse width modulated direct current - direct current converter circuit of claim 1 additionally comprising a second controllable switch connected across said second snubber diode and a second control signal input connected to said second controllable switch to turn said second controllable switch ON during a maximum magnitude of a second polarity opposite to the first polarity in a pulse of the chopped alternating current signal.

3. The pulse width modulated direct current—direct current converter circuit of claim 2 in which said first and second controllable switches each have current flow electrodes which are connected together and connected to said first snubber capacitor.

4. The pulse width modulated direct current—direct current converter circuit of claim 2 additionally comprising a second snubber capacitor serially connected to said second snubber diode, said second snubber diode and second snubber capacitor being connected across said second rectifier diode.

5. The pulse width modulated direct current—direct current converter circuit of claim 1 further comprising a low-pass filter connected to said first and second rectifier diodes, an output of said low-pass filter providing a direct current output at a second voltage.

6. The pulse width modulated direct current—direct current converter circuit of claim 1 in which said bridge-type primary switching circuit is a full-bridge pulse width modulated switching circuit.

7. The pulse width modulated direct current—direct current converter circuit of claim 6 in which said bridge-type primary switching circuit comprises second and third controllable switches connected between said input for the direct current and one end of said transformer primary winding, fourth and fifth controllable switches connected between said input for the direct current and another end of said transformer primary winding, a second and third control signal input connected to said second and third controllable switches to turn said second and third controllable switches ON during a maximum magnitude of a first polarity in a pulse of the chopped alternating current signal.

8. The pulse width modulated direct current—direct current converter circuit of claim 7 in which said first, second, third, fourth, and fifth controllable switches comprise metal oxide semiconductor field effect transistors.

9. The pulse width modulated direct current—direct current converter circuit of claim 7 in which the first control signal and the second control signal are generated from a common control signal by means of a first delay element for the first control signal and a second delay element for the second control signal.

10. A pulse width modulated direct current—direct current converter circuit, which comprises a bridge-type primary switching circuit having an input for a direct current at a first voltage and having an output supplying a chopped alternating current signal derived from the direct current, a transformer including a primary winding connected to the output of the primary circuit and a center-tapped secondary winding, a half-bridge rectifier including first and second rectifier diodes connected to each of two end terminals of said center-tapped secondary winding, and a snubber circuit connected across said first and second rectifier diodes, said snubber circuit including a first snubber diode connected in a reverse direction to said first rectifier diode, a first snubber capacitor serially connected to said first snubber diode, said first snubber diode and first snubber capacitor being connected across said first rectifier diode, a first controllable switch connected across said first snubber diode, a second snubber diode connected in a reverse direction to said second rectifier diode, a first control signal input connected to said first controllable switch to turn said first controllable switch ON during a maximum magnitude of a first polarity in a pulse of the chopped alternating current signal and a second controllable switch connected across said second snubber diode and a second control signal input connected to said second controllable switch to turn said second controllable switch ON during a maximum magnitude of a second polarity opposite to the first sign in a pulse of the chopped alternating current signal.

11. The pulse width modulated direct current—direct current converter circuit of claim 10 further comprising a low-pass filter connected to said first and second rectifier diodes, an output of said low-pass filter providing a direct current output at a second voltage.

12. The pulse width modulated direct current—direct current converter circuit of claim 10 in which said bridge-type primary switching circuit is a full-bridge pulse width modulated switching circuit.

13. The pulse width modulated direct current—direct current converter circuit of claim 12 in which said bridge-type primary switching circuit comprises third and fourth controllable switches connected between said input for the direct current and one end of said transformer primary winding, fifth and sixth controllable switches connected between said input for the direct current and another end of said transformer primary winding, a third and fourth control signal input connected to said third and fourth controllable switches to turn said third and fourth controllable switches ON during a maximum magnitude of a first polarity of a pulse of the chopped alternating current signal.

14. The pulse width modulated direct current—direct current converter circuit of claim 13 in which said first, second, third, fourth, fifth and sixth controllable switches comprise metal oxide semiconductor field effect transistors.

15. The pulse width modulated direct current—direct current converter circuit of claim 13 in which the first control signal and the third control signal are generated from a first common control signal by means of a first delay element for the first control signal and a second delay element for the third control signal and the second control signal and the fourth control signal are generated from a second common control signal by means of a third delay element for the second control signal and a fourth delay element for the third control signal.

16. The pulse width modulated direct current—direct current converter circuit of claim 15 in which the fifth control signal is generated by said second delay element and the sixth control signal is generated by the fourth delay element.

17. The pulse width modulated direct current—direct current converter circuit of claim 13 in which the first control signal and the third control signal are generated from a first common control signal by means of a first AND circuit receiving the first common control signal and a second common control signal, a first delay element for the first control signal receiving an output from said first AND circuit and a second delay element receiving the first common control signal for the third control signal, the second control signal and the fourth control signal are generated from a third common control signal by means of a second AND circuit receiving the third common control signal and a fourth common control signal, a third delay element for the second control signal receiving an output from said second AND circuit and a fourth delay element receiving the third common control signal for the fourth control signal.

18. The pulse width modulated direct current—direct current converter circuit of claim 17 in which the fifth control signal is generated from the second common control signal by means of a fifth delay element and the sixth control signal is generated from the fourth common control signal by means of a sixth delay element.

* * * * *